(12) United States Patent
Van Den Berg (10) Patent No.: US 8,281,744 B2
(45) Date of Patent: Oct. 9, 2012

(54) MILKING IMPLEMENT

(75) Inventor: Karel Van Den Berg, Bleskensgraaf (NL)

(73) Assignee: Maasland N.V., Maassluis (NL)

( * ) Notice: Subject to any disclaimer, the term of this patent is extended or adjusted under 35 U.S.C. 154(b) by 478 days.

(21) Appl. No.: 11/958,400

(22) Filed: Dec. 18, 2007

(65) Prior Publication Data

US 2008/0149034 A1 Jun. 26, 2008

(30) Foreign Application Priority Data

Dec. 20, 2006 (NL) ..................................... 1033090

(51) Int. Cl.
*A01J 5/00* (2006.01)
(52) U.S. Cl. .................. 119/14.08; 119/14.18
(58) Field of Classification Search ............... 119/14.08, 119/14.18, 14.01; *A01J 5/00, 5/03, 3/00*
See application file for complete search history.

(56) References Cited

U.S. PATENT DOCUMENTS

| | | | | |
|---|---|---|---|---|
| 1,010,204 A | * | 11/1911 | Umrath ...................... | 119/14.16 |
| 4,034,713 A | * | 7/1977 | Umbaugh .................. | 119/14.02 |
| 5,056,466 A | * | 10/1991 | Dessing et al. ............. | 119/525 |
| 5,678,506 A | * | 10/1997 | van der Berg et al. ..... | 119/14.18 |
| 5,697,324 A | * | 12/1997 | van der Lely .............. | 119/14.08 |
| 5,791,284 A | * | 8/1998 | van der Lely .............. | 119/14.08 |
| 2005/0066904 A1 | * | 3/2005 | Berg et al. .................. | 119/14.08 |
| 2005/0076841 A1 | | 4/2005 | van der Berg et al. | |

FOREIGN PATENT DOCUMENTS

| | | |
|---|---|---|
| EP | 1447007 A | 8/2004 |
| NL | 1024522 A1 | 10/2003 |
| WO | 9846069 A1 | 10/1998 |

* cited by examiner

*Primary Examiner* — Son T Nguyen
*Assistant Examiner* — Shadi Baniani
(74) *Attorney, Agent, or Firm* — David P. Owen; Coraline J. Haitjema; Hoyng Monegier LLP (57) ABSTRACT

An autonomous mobile milking implement having a frame with, a sub-frame which is adjustable in height and which has at least one teat cup holder and a teat cup movable relative thereto. The teat cup holder is tiltable, via a tilting mechanism coupled to the teat cup holder and the frame between a substantially vertical position and a second partially inverted position. The milking implement protects the teat cups against contamination and is capable of storing them in a compact manner.

11 Claims, 5 Drawing Sheets

MILKING IMPLEMENT

CROSS REFERENCE TO RELATED APPLICATIONS

This application claims priority from Dutch application number 1033090 filed on Dec. 20, 2006, the contents of which are hereby incorporated by reference in their entirety.

BACKGROUND OF THE INVENTION

1. Field of the Invention

The present invention relates generally to milking implements and more particularly to milking implement of the type comprising a frame with, disposed thereon, at least one teat cup holder for carrying a teat cup. The invention further relates to milking systems and in particular milking systems comprising autonomous mobile milking implements.

2. Description of the Related Art

Document US2005/0076841, the contents of which are hereby incorporated by reference in their entirety, discloses a teat cup carrier carrying at its upper side teat cups and further milking elements. The teat cup carrier is capable of attaching the teat cups in an operative position with the aid of an upwardly movable teat cup lifting device.

A disadvantage of the known milking implement is that the teat cups, after use, cannot be stored in a reliable and space efficient manner in which they are protected against contamination. Moreover, the teat cups cannot be cleaned in a reliable manner. There is thus a particular need for an improved milking implement.

BRIEF SUMMARY OF THE INVENTION

According to the present invention there is provided an autonomous mobile milking implement comprising a frame, a sub-frame disposed on the frame and being adjustable in height thereto and at least one teat cup holder having a teat cup movable relative thereto, wherein the teat cup holder is arranged to tilt between a first position in which the teat cup placed on the teat cup holder is substantially vertical and has an upward orientated aperture, and a second position, which is at an angle H to the first position, H amounting to at least 135°. Such a milking implement provides the possibility of tilting the teat cup, via the teat cup holder, to a position in which contamination either from above or from the lateral sides cannot, or at least to a lesser extent, penetrate into the teat cup. Moreover, when the teat cup is being cleaned by means of spraying with a cleaning liquid, liquid will be less able to penetrate into the teat cup and liquid sprayed onto the teat cup will readily flow or drip from it.

The sub-frame may preferably be a plateau or the like, but may in principle also be a gripping device, as disclosed in the aforementioned document US2005/0076841.

In a preferred embodiment, H amounts to between 160° and 180°. In this case, the teat cup is completely or almost completely upside down, in which position an optimum discharge of cleaning liquid is ensured. Furthermore, there is thus required a minimum space, at least measured in floor surface.

In one embodiment, the tilting mechanism comprises one or more joints disposed between the teat cup holder and the sub-frame. This is a simple, but efficient and reliable manner of enabling said tilting. The tilting may be performed, for example, in one single turn over the angle H. There may, of course, also be provided a joint between the sub-frame and the frame, although this will lead in many cases to a larger implement; there will at least be required more space to allow the teat cup to tilt.

In a special embodiment, the tilting mechanism comprises a first joint between the teat cup holder and the sub-frame and a second joint between the sub-frame and the frame, wherein the first joint is tiltable over an angle H1, and the second joint is tiltable over an angle H2, in which case H1 +H2 =H. Due to the two-stage tilting the whole of sub-frame and teat cup holder with teat cup will be somewhat more compact, so that the milking implement has to occupy less space and may be positioned more easily to under, for example, a next cow.

Furthermore, there is provided the possibility of performing the tilting in two phases: a first phase in which the teat cup is lowered to some extent, by means of a favorable positioning of the tilting point, followed by a second tilting in which the desired angle to the vertical is achieved by tilting around a second tilting point. This will be set out in further detail hereinafter.

H1 is preferably approximately 90°. In this case, the teat cup may in principle be disposed in a flat condition against the sub-frame, in order thus to occupy as little space as possible. This is, for example, a favorable low position for movement to a position under a dairy animal. Tilting about the second joint, over 45° to 90°, preferably 70° to 90°, will complete the tilting, for example for storage or cleaning.

In a particular embodiment, the first and second joints are designed to tilt in the same plane. In case of tilting in the same plane, it is possible for the teat cup to be stored in a compact manner on the teat cup holder in the milking implement. If the joints were designed to tilt in different planes, the teat cup would generally project to some extent, although this is not excluded according to the invention.

In a special embodiment, a line through the first joint and the second joint makes an angle b with the frame. In this case, it is assumed that the frame is horizontal, or at least parallel to the ground. Here, the angle b is not equal to 0, and preferably between 15° and 45°, for example approximately 30°. If the first and second joints are arranged in a line which makes an angle b with the frame, it may be ensured in a simple manner that, at a first tilting, the teat cup will be lowered in height and, when tilting about the second tilting point, will subsequently be able to tilt, for example, to the horizontal, or to tilt further, for example, to the vertical. In this case, it is assumed that the tilting point near the teat cup is the highest positioned tilting point.

In a particular embodiment, the first joint is designed to tilt over an angle c, c being at least as great as b. At such tilt angles it is efficiently ensured that the teat cup, when tilting about the first joint positioned near the teat cup, will be lowered relative to the frame, and it is in particular ensured that the teat cup will be lowered at any rate when tilting about the other, second tilting point.

In a particular embodiment, the second joint is designed to tilt over an angle d, the angle c and the angle d forming together at least a right angle. In this case, it is advantageous that tilting takes place in two phases via the intermediate arm, because, by not tilting over an angle of 90°, it is possible for the intermediate arm to keep the lower side of the teat cup somewhat above the sub-frame, so that it is possible for the upper side of the teat cup to tilt already then more than 90°.

In a preferred embodiment, the milking implement comprises a plurality of teat cup holders, each with a teat cup. By means of a plurality of teat cups, it is possible to milk a plurality of teats simultaneously, which is, of course, time-saving. If, for example, a cow has to be milked, there are preferably provided four teat cups. If desired, the number of teat cups may be adapted to the number of teats of the animal to be milked.

In a special embodiment having at least two teat cup holders, at least one joint comprises a pivot that allows tilting in one tilting plane, at least two of the tilting planes being at an angle that is not equal to zero with respect to each other. In this case, there are preferably provided four teat cup holders that are arranged in a trapezium shape, the tilting planes intersecting at the short side of the trapezium. In this manner, there is provided a milking implement that is capable of storing the usual four teat cups in a very compact manner and that, moreover, is capable of being positioned in a simpler manner between and in the vicinity of the hind legs of the cow or other dairy animal, by first performing, for example, a tilting over substantially 90°. The rear teats of the cow or the like will often be located very close to the hind legs, which limits the positioning space. The mentioned embodiment may in this case be placed in a simpler manner without irritation for the cow.

In particular, the milking implement further comprises at least one tilting actuator designed to tilt at least one of the teat cup holder and the sub-frame. The tilting actuator may in this case be chosen from all known suitable types of actuators, such as pneumatic or hydraulic actuators, electric motors, etc. Such actuators may also be simple two position actuators, being thus considerably less complex than positionable actuators used for robotic positioning systems. In a particularly preferred embodiment, the milking implement may comprise a replacing tether connecting the teat cup to the milking implement and being operable to return the teat cup to the teat cup holder. Operation of the tether may be arranged to at least partially cause the desired tilting of the teat cup holder.

The milking implement may further comprise a stop on the frame, wherein the second joint co-operates with the stop, wherein the sub-frame is tiltable about the stop, if the sub-frame is moved downward. In this case, gravitational force may be used, for example, as the tilting force. This ensures, for example, that more types of actuators are suitable, because they only have to realize a tilting of, for example, 90°, the remaining tilt angle being effected by the tilting relative to the stop.

The above-mentioned embodiment may, for example, be designed as follows. The implement may comprise a first joint between the teat cup and the sub-frame, as well as an actuator for tilting the teat cup about said first joint, over, for example, 90°. Furthermore, the milking implement may comprise a second actuator which is capable of displacing the sub-frame in vertical direction relative to the frame. Said second actuator comprises, for example, a parallelogram rod system or the like. The milking implement further comprises a second joint between the sub-frame and the frame, as well as a stop which, for example, abuts against the sub-frame during tilting of the teat cup about the first joint. If the second actuator subsequently moves the sub-frame downward, the sub-frame will tilt about the second joint. In this case, the position of the stop as well as the path of the sub-frame may be such that the further tilting over 45° to 90° will take place under continuous contact with the stop. It is also possible that the centre of gravity of the teat cup, and/or of the whole of the sub-frame and the components tilting together with the sub-frame, is situated in such a way that, after tilting about the stop has started, the further tilting will take place under the influence of gravitational force. Herein, the sub-frame may be led, for example, via an arched slotted hole, for example in a quarter circle shape. The slotted hole may be disposed in the sub-frame, in which case the frame comprises a guide pin that co-operates with the slotted hole, or the positions of the slotted hole and the guide pin have been exchanged. Incidentally, other tilting mechanisms and modes are also possible, as well as other angles than 90° and 45-90°, respectively.

A favorable milking implement according to the invention further comprises a cleaning device with a sprayer that is capable of spraying a fluid onto the teat cup. This makes it possible for the milking implement to be self-supporting as regards cleaning, and, as a result thereof, to make an optimum use of the advantages of the teat cup arrangement enabled by the invention. The milking implement may further comprise a cleaning fluid reservoir and, if desired, a collecting reservoir for used cleaning fluid, also in view of the relatively controlled dripping of liquid from the teat cup. Of course, the cleaning may also take place externally, that is to say by means of a separate device.

In a particular embodiment, the sprayer is designed to spray an inner side of the teat cup. It is thus possible, for example, to clean and/or disinfect a teat cup by spraying with a suitable fluid, such as steam or a liquid containing a disinfecting means. Due to the fact that tilting toward the angles, according to the invention, also enables internal cleaning without cleaning fluid penetrating into a milk line, there is provided an extraordinarily flexible milking implement that is capable of milking in a very hygienic manner.

A particular embodiment is characterized in that the teat cup surrounds the sprayer at least partially in the second position. In other words, it is then possible for the sprayer to be placed at least partially in the teat cup. This makes it possible, for example, to cause the sprayer to spray not only upward, that is to say into the teat cup, but also sideward, which is much more efficient in many cases. Moreover, the efficiency has been increased because the risk of cleaning fluid landing outside the teat cup has been reduced.

In a favorable embodiment, the frame comprises a robot arm. With the aid of this robot arm it is possible for the sub-frame with the at least one teat cup to be moved in an efficient manner to a position under the dairy animal to be milked.

According to an important aspect of the invention, special attention should be paid to the compactness of the entire implement, because such an autonomous vehicle does not only have to drive as a whole between and under cows or other dairy animals, but also because such implements are often provided with additional, mostly rather voluminous sub-implements, such as, for example, a milk storage, preferably cleaning means, navigation means, etc. Nevertheless, it is also possible to design the milking implement as a stationary implement. In all cases, the milking implement may be provided with a movable frame, for example a robot arm as described above.

Moreover, the milking implement may be provided with one or more of the particular features mentioned hereinafter.

The frame may be provided with propelling and steering elements, in particular caterpillar tracks or wheels, preferably moreover with at least one additional propelling or rolling or sliding element. It may be sufficient for the frame in this manner to have two wheels for a sufficiently smooth displacement.

Preferably, the frame moreover comprises a component that facilitates displacement at a third supporting point, such as an additional wheel or a sliding element. One, or preferably two additional wheels, so that in total four wheels are provided, give an optimum driving comfort. On the other hand, an additional ball wheel, for example, provides greater maneuverability. A sliding element has, on the other hand, the advantage of allowing an extraordinarily robust design without being unduly hindered by contamination.

In a particular embodiment, the milking implement further comprises a motor for driving at least one of the propelling elements. By means of such a motor the milking implement is self-propelled, and therefore need not be displaced by an operator. All this has, of course, advantages in relation to the amount of work to be done by an operator, which amount may thus become very small. A motor control is advantageously provided for the driving motor. The latter may be connected, for example, with a GPS-system or the like for orientation of the milking implement in the area where it is located.

In a preferred embodiment, the milking implement further comprises a milk storage vessel. In this embodiment, the milking implement is in principle completely autonomous. After milking a cow or other animal, or a plurality of animals in the case of a sufficiently large milk storage vessel, the milking implement is capable of driving, either autonomously or not, to a larger milk storage tank in order to supply therein the contents of the milk storage vessel. A disadvantage of providing such a milk storage vessel is that, of course, space is needed for storing the milk. An advantage, however, is that no hoses are needed, behind which an animal or the implement may get caught, etc. However, in another embodiment the milking implement may also be connectable or connected to a milk storage tank by means of a milk transport line. It is then possible to design such a milking implement as a particularly compact one.

In particular, the milking implement further comprises a teat detecting device, a teat cleaning device and/or a teat cup cleaning device. Such devices are known in the state of the art and serve to obtain a milking implement that is more reliable, more hygienic, etc. However, it is also possible for the person skilled in the art to combine the milking implement with any other means known in the state of the art in order to obtain the advantages related thereto.

The invention also provides a milking system comprising a milking implement and an external tilting device, wherein the milking implement comprises: a frame with at least one teat cup holder with a teat cup movable relative to the frame, wherein the teat cup holder is tiltable, via a tilting mechanism coupled to the teat cup holder and the frame, between a position in which the teat cup placed on the teat cup holder is substantially vertical and has an upward orientated aperture, and a second position, which is at an angle H to the first position, wherein the external tilting device is designed to tilt the milking implement as a whole over an angle H3 greater then zero, H+H3 amounting at least to 135°, and preferably to between 160° and 180°.

In such a milking system, an external mechanism or construction may be used, so that, in the design and the construction of the milking implement itself, the tilt angle of the teat cup(s) need not be taken into account. It may be sufficient, for example, to tilt the teat cup over 90° and to have the external tilting device provide the remaining tilt angle.

The milking implement is preferably chosen according to the invention, the frame comprising more preferably a mobile vehicle, in particular an autonomous mobile vehicle. In this embodiment, it is possible, for example, to use the propelling capacity of the vehicle in order to realize tilting of the vehicle. However, it is not necessary for the milking implement to comprise a vehicle. For example, the external tilting device comprises a gripping device that allows tilting.

Advantageously, H3 amounts to at least 45°, preferably to between 70° and 110°. In case of an angle H3 of at least 45°, it is sufficient for the teat cup to tilt over 90° at the most relative to the rest of the milking implement, although a greater tilt angle is not excluded, of course. It is then not necessary, for example, to tilt beyond a bottom of a sub-frame. An advantage of a greater angle H3, in particular greater than 90°, is that it is then well possible to stabilise the milking implement in that position, as will be explained below in further detail.

In one embodiment, the external tilting device comprises a guide path that allows the milking implement to drive onto it. In this embodiment, tilting takes place at least partially due to the fact that the milking implement, in the form of a vehicle, drives onto the guide path. The tilting path may have a suitable shape, such as a ramp, a part of the arc of a circle, etc.

In a particular embodiment, the external tilting device further comprises an auxiliary guide means which extends remotely from the guide path and is arranged in such a way that the milking implement, when driving onto the guide path, is forced by the auxiliary guide path to come at least partially into contact with said guide path. The milking implement is thus forced between the guide path and the auxiliary guide means, so that the orientation of the milking implement will be determined in a more reliable manner. As a result thereof, for example, unintentional falling over is prevented, and more stability will be provided during storage, cleaning, etc. The auxiliary guide means may be designed, for example, as a sort of 'railing'. The milking implement may be provided with one or more components that are capable of co-operating with the auxiliary guide means.

In one embodiment, the external tilting device comprises a gripper that is designed to engage the milking implement and to tilt it. As already mentioned above, such a gripper may be provided if the milking implement does not comprise a vehicle. Also if the milking implement comprises a vehicle, a gripper may be provided, of course, in which case the gripper need not be displaceable, or to a much lesser extent, to be able to grip the milking implement.

BRIEF DESCRIPTION OF THE DRAWINGS

The invention will be explained hereinafter in further detail with reference to the drawing, in which some non-limiting exemplary embodiments are shown, and in which.

DESCRIPTION OF ILLUSTRATIVE EMBODIMENTS

Figure 1:
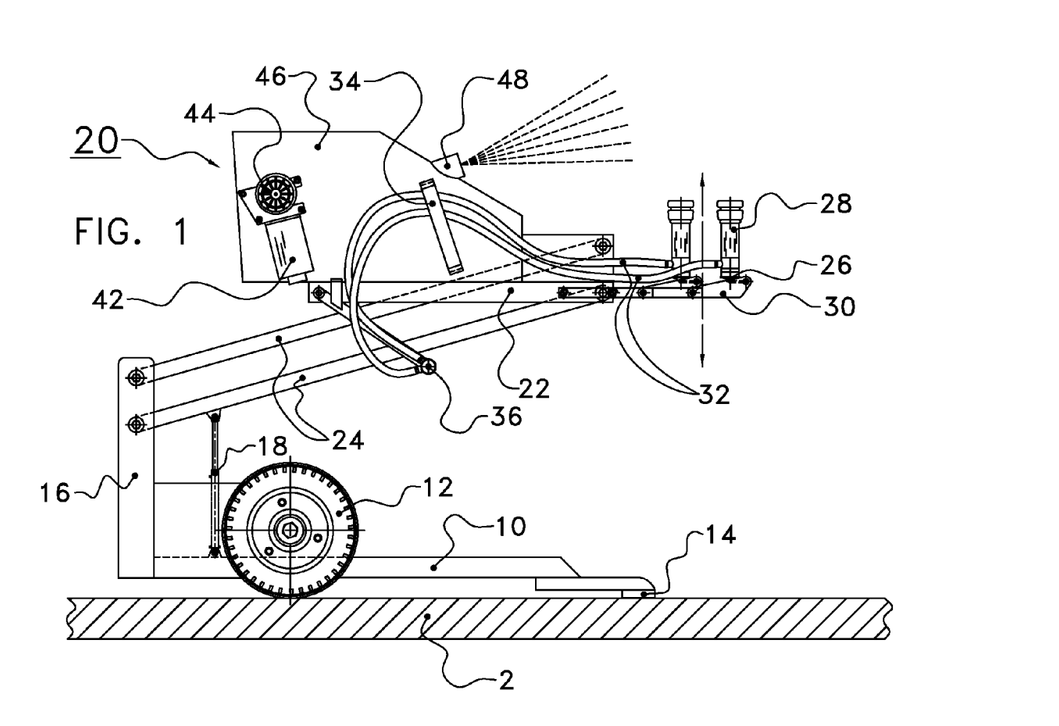
FIG. 1 is a schematic side view of an embodiment of the milking implement according to the invention.

FIG. 1 is a schematic side view of an embodiment of the milking implement according to the invention.

Here, 2 denotes the floor on which the milking implement is supported. The latter comprises a frame 10 and a sub-frame 20.

The frame 10 comprises wheels 12 and a sliding shoe 14, as well as an upright portion 16. The sub-frame 20 comprises a bottom portion 22 and a casing 46, and an adjustment in height with a cylinder 18 and a parallelogram construction 24. Furthermore, there are provided in total four (of which two visible) teat cup holders 26, each with a teat cup 28 and each disposed on a tiltable intermediate arm 30. Milk lines 32 extend via a bracket 34 to the milk discharge tube 36.

The embodiment shown is an autonomous mobile implement. Alternatively, there is also aimed at a stationary milking implement, for example a milking implement fixedly arranged in a milking parlor and, if desired, comprising a movable robot arm.

FIG. 1 also shows a connection 42 for a vacuum line and a pulsator 44 that is disposed on the casing 46. The casing 46 is also provided with a teat detecting camera 48.

The milking implement shown in FIG. 1 comprises two wheels 12 and a sliding shoe 14. There is thus obtained a good compromise between mobility by means of wheels that are capable of driving rather easily over, for example, small obstacles, and a small height by means of a sliding shoe. The latter is very advantageous when placing the milking implement to under a cow's udder. Alternatively, there may be provided other displacing means, such as caterpillar tracks.

The wheels 12 or the like may optionally be driven by a motor (not shown), preferably even each driven by a motor. The latter option offers the advantage of no axle being necessary between the wheels 12, and, moreover, of maneuverability being provided in a simple manner by an independent control of the wheels. A control of the motor or motors, and consequently of the milking implement, may also be provided on the implement. Alternatively, it is also possible to equip the milking implement without a motor, in which case the implement is, for example, driven manually to under a cow or is otherwise brought to under a cow.

Furthermore, the frame 10 need not comprise much more than a supporting structure which is preferably composed in such a way that various lines of the milking implement, such as milk lines 32, are prevented from touching the floor 2.

The sub-frame 20 is adjustable in height relative to the frame 10 and consequently to the floor 2. For this purpose, the implement comprises a retractable and extendable cylinder 18 that is connected between the frame 10 and the sub-frame 20, to be precise to one of the two parallel bars of a parallelogram construction 24. By retracting or extending the cylinder 18, the bars 24 of the parallelogram construction will pivot, and the sub-frame 20 will be displaced. The adjustment in height is desirable in order to be able to attach the teat cups 28 at different (udder) heights. Incidentally, instead of the parallelogram construction 24 and the single cylinder 18, other height adjustment mechanisms may be applied as well, such as a combination of a crown wheel and a gear wheel co-operating therewith, the sub-frame being connected to one (gear) wheel and the frame to the other (gear) wheel, or, for example, one or more extendable cylinders, etc.

The milk lines 32 extend via a guide bracket 34 to a milk discharge tube 36 that is connected (not shown) to a milk storage (neither shown).

There may be provided a milk storage facility in the form of an external milk tank, the milking implement and the milk tank then being interconnected by means of a hose extending, for example, from the milk discharge tube 36. Alternatively, a milk storage vessel is provided on board of the milking implement, for example in the area at or between the wheels 12, or in the pulsator 44.

Moreover, the teat cups are connected, via a not shown vacuum or pulsator line, to the associated connection 42 that is operatively connected itself to the pulsator 44. Said pulsator, in this case the drum, may be chosen by the person skilled in the art from drums known in the state of the art, and will not be explained in further detail. The drum 44 is disposed on the supporting structure 46 that need not comprise much more than a mounting plate or the like.

There is further shown a teat detecting camera 48 for detecting the teat positions of an animal to be milked. Such a teat detecting camera is known per se to the person skilled in the art and will therefore not be described here in further detail. However, it is pointed out that the camera may additionally be equipped for recognizing legs and other obstacles, as well as for navigating in areas such as sheds and milking parlors. The latter option will in particular be useful, of course, if the milking implement is provided with a drive for autonomous self-propelled movement.

Figure 2:
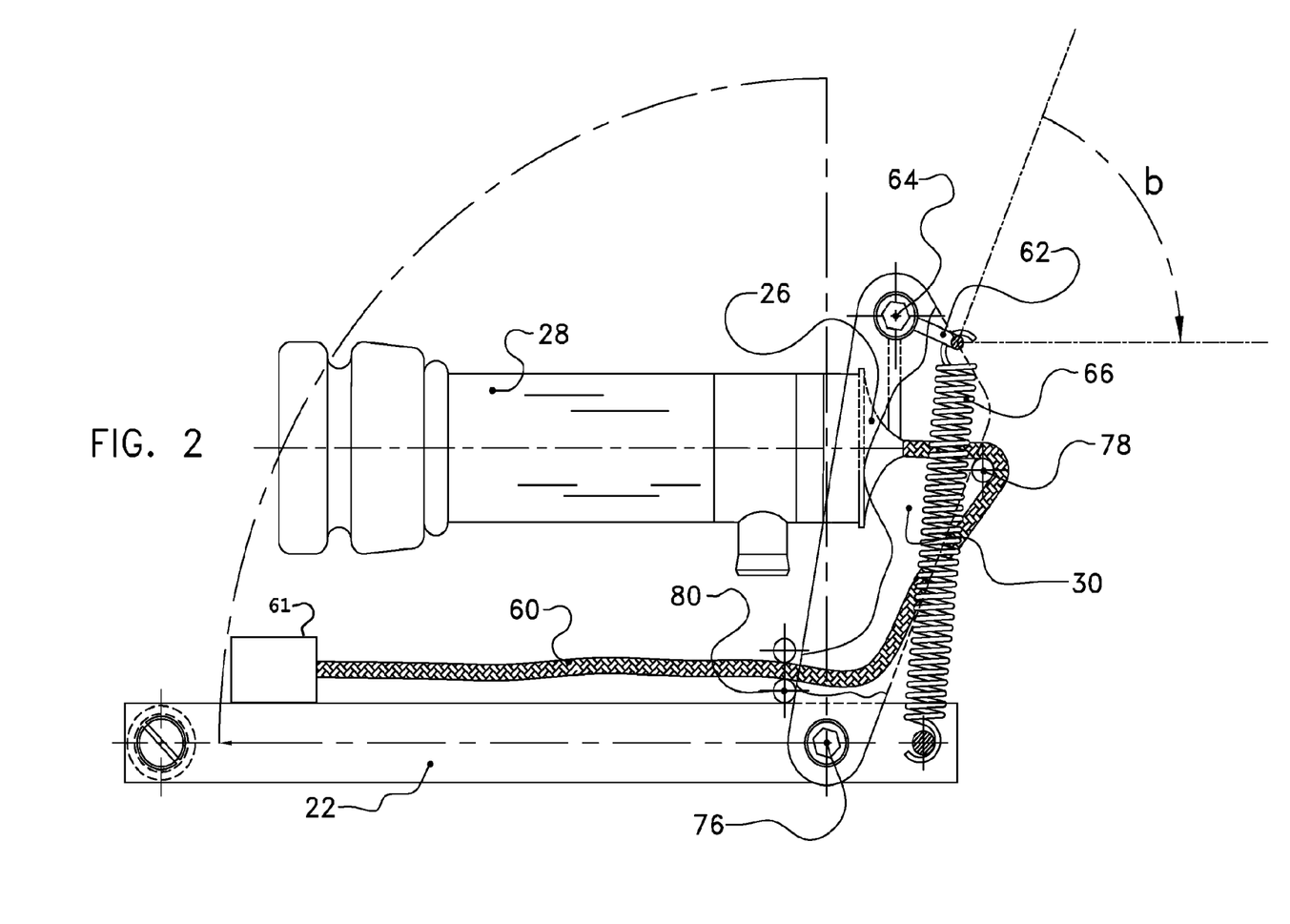
FIG. 2 is a schematic side view of a further detail of the invention.

FIG. 2 is a schematic side view of a further detail of the invention.

Here, 28 is a teat cup on a teat cup holder 26, with connected thereto a replacing tether 60 that is led via a first guide means 78 and a second guide means 80 that are both fastened to an intermediate arm 30 that is capable of pivoting about an axle 76. The teat cup holder 26 is fastened to an end of a small arm 62 that is pivotable about an axle 64 and that is connected at the other end to a spring 66 that is connected itself to the bottom portion 22.

In the position shown in FIG. 1, the teat cup 28 is upright, as is usual for milking. This is ensured by the spring tension of the spring 66. The replacing tether 60 is free of tension, and the teat cup is capable of moving freely, and may therefore also be detached from the teat cup by the cow, for example when she moves to some extent.

When the milking has been ended and the teat cup 28 has been detached, the latter will be replaced in the first instance onto the teat cup holder 26. This takes place by winding up the replacing tether 60. The tether 60 can be operated, for example, by an actuator 61. When the winding has ensured that the teat cup has been replaced, the replacing tether 60, when being wound further, will exert a pulling force on the teat cup holder 26, via the small arm 62. This will lead to a tilting movement of the teat cup holder 26 with the teat cup 28. The tilting continues until an angle of 90° is reached. For this purpose, the cord pulling force is sufficient to overcome the spring resistance against tilting about the axle 76. Due to this, the intermediate arm will tilt further until the teat cup 28 reaches, for example, a horizontal position. For this purpose, the intermediate arm 30 should in this case pivot over an angle b. It is also possible to pivot over a somewhat smaller, or even a greater angle.

Figure 3A:
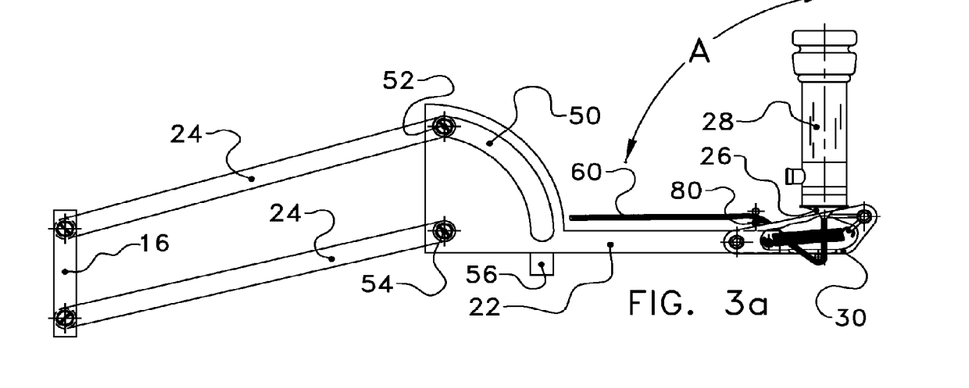
FIGS. 3a, b and c show in a schematic side view a part of a milking implement according to the invention.
Figure 3B:
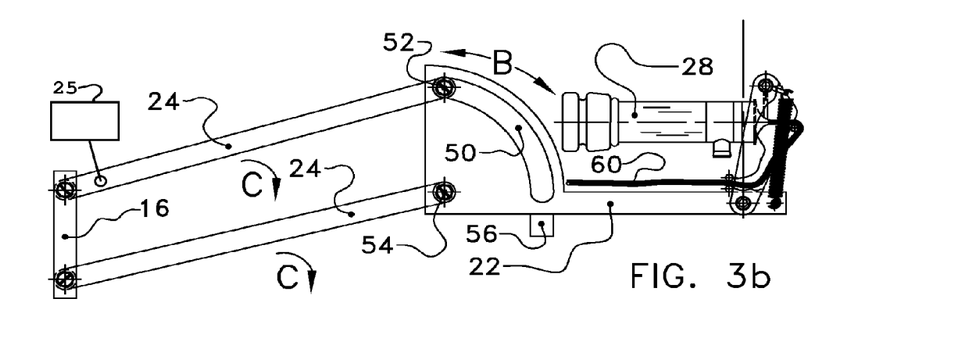
Figure 3C:
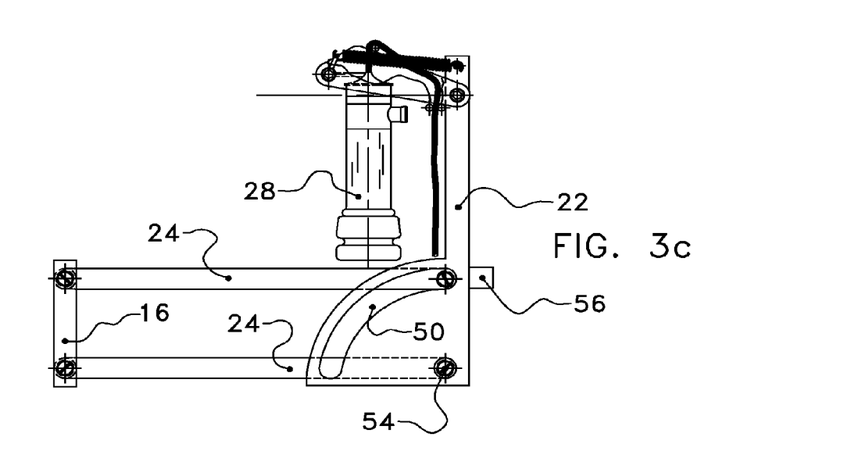

FIGS. 3a, b and c show in a schematic side view a part of a milking implement according to the invention. Here, as in the remaining part of the drawing, corresponding components are denoted by the same reference numerals.

FIG. 3a shows an initial position, for example during milking, including a slotted hole 50, into which the guide means 52 has been led. The bottom portion 22 may pivot about the axle 54. A stop is denoted by 56, and is in a fixed position relative to the frame (not shown), or is at least movable in such a way that it is in operative co-operation with the bottom portion in order to tilt the latter.

In this situation, the position of the teat cup 28 is substantially vertical and there is no tension on the cord 60.

In FIG. 3b, the teat cup 28 is positioned horizontally, in which situation the arm 30 with the teat cup 28 is tilted by tightening the cord 60. For this purpose, for example, the technique according to FIG. 2 may be used.

Subsequently, the bars of the parallelogram construction 24 are lowered in the direction of arrows C, for example by means of actuator 25. By co-operation of the bottom portion 22 and the stop 56, the bottom portion 22 will tilt about the axle 54, in which case the guide means 52 will slide via the slotted hole 50. The situation of FIG. 3c is thus reached, in which the teat cup is hanging in a substantially vertical position.

Figure 4:
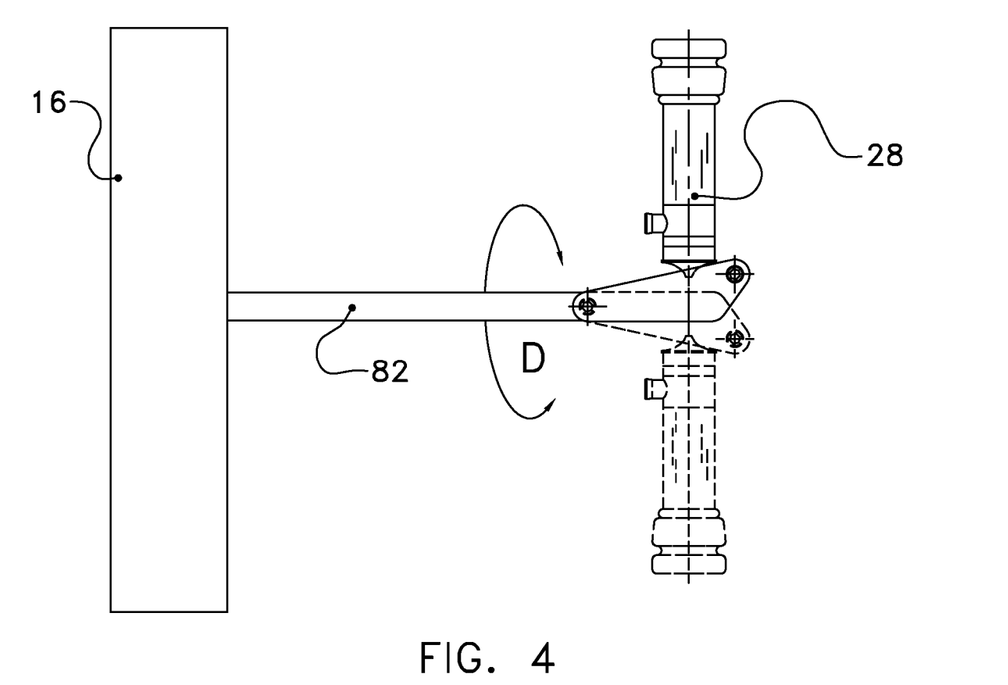
FIG. 4 shows schematically part of a very simple embodiment of the invention.

FIG. 4 shows very schematically a very simple embodiment. In this figure, 16 is a very general frame, which may also comprise, for example, a stationary milking installation. 82 denotes an arm which is capable of pivoting about its axle, that is to say in the direction of arrow D. By simply pivoting the arm 82, it is possible to position the teat cup 28 under any desired angle, according to the invention, advantageously in a substantially vertical position, as shown by dashed lines.

Figure 5:
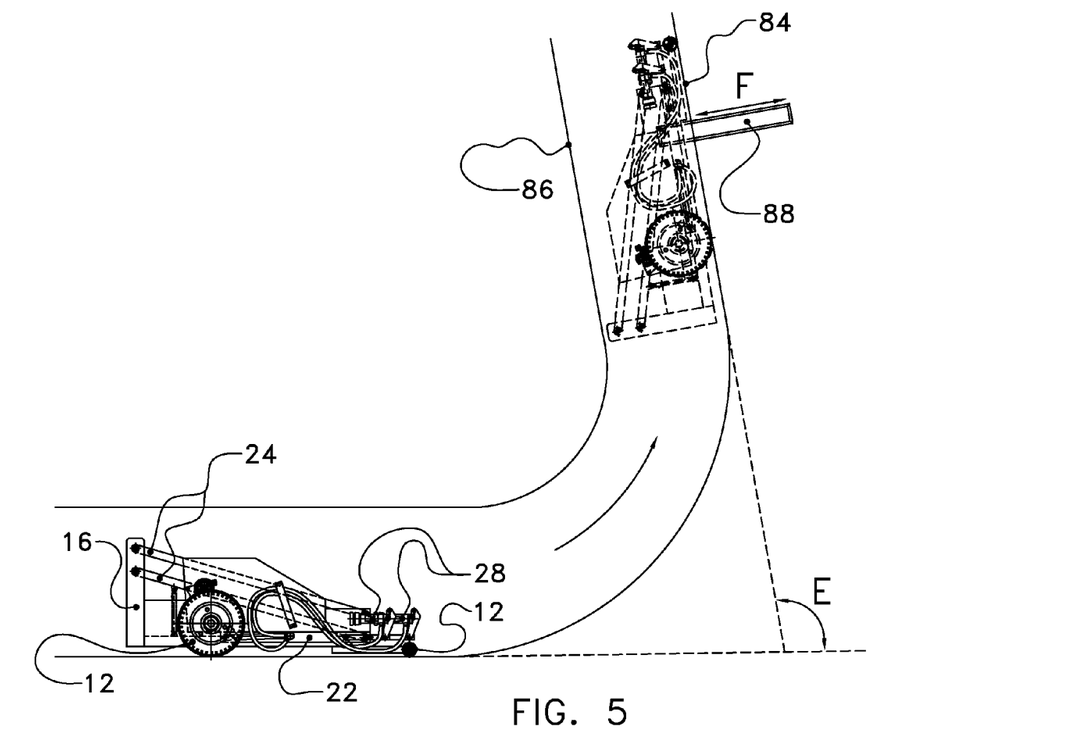
FIG. 5 shows an embodiment of a milking system according to the invention.

FIG. 5 shows an embodiment of a milking system according to the invention. It shows a milking implement according to FIG. 1, now with front and rear wheels 12. The teat cup 28 has tilted over 90° and almost abuts against the bottom portion 22. A guide path 84 makes a maximum angle E with the horizontal and an auxiliary guide means 86 is also shown. Locking means 88 is movable in the direction of arrow F.

During operation, the milking implement will drive toward the guide path and make an increasing angle with the horizontal, until it reaches the angle E, which is in the figure approximately 100°. The auxiliary guide means 86 serves to prevent the milking implement from turning over and co-operates for this purpose with the milking implement, for example with an upper surface of the frame 16. In order further to prevent the milking implement from sliding downward, there may be provided a locking means 88 which moves through the guide path 84 to under the milking implement in order to engage the latter.

The minimum angle E depends on the tilt angle that can be reached in the milking implement. If that tilt angle is already obviously greater than 90°, then the angle E should be proportionally smaller than 90° in order still to achieve a vertical position of the teat cup 28. Moreover, a vertical position is not necessary according to the invention.

Figure 6:
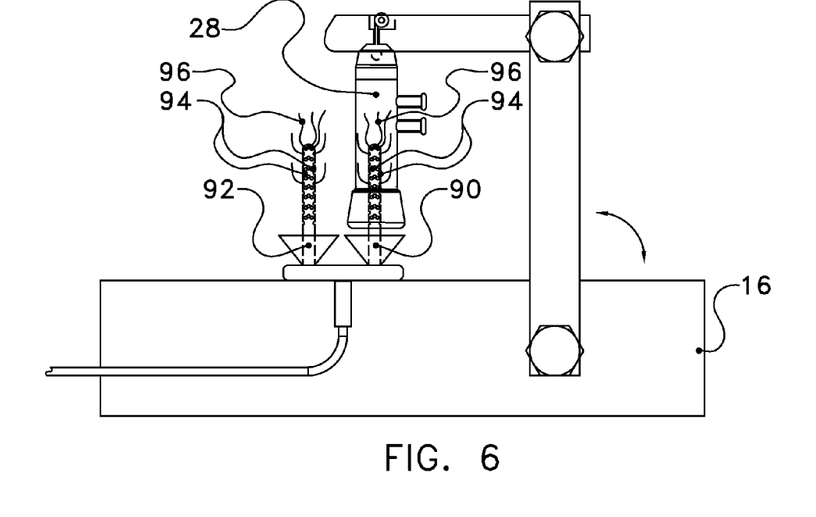
FIG. 6 shows a further detail of a milking implement according to the invention.

FIG. 6 shows a further detail of a milking implement according to the invention. Here, 90 denotes a first sprayer and 92 denotes a second sprayer, in each case with apertures 94 through which a spray mist 96 is emitted.

It is visible that the first sprayer 90 is partially located in the teat cup 28. Its spray mists are capable of cleaning and/or disinfecting the inner side of the teat cup 28, and the fluid used will drip from the teat cup without penetrating into a milk line (not shown). Likewise, the second sprayer 92 will be able to clean the outer side of the teat cup 28, and fluid will neither penetrate into the milk line. The angle through which the teat cup is positioned may also be smaller than 180°, for example 135° or 160°, to provide the advantages of the invention.

The invention as thus disclosed is not limited to the shown embodiments. The person skilled in the art will be able to apply various modifications and adaptations within the scope of the invention, the scope of protection for the invention being determined by the accompanying claims.

What is claimed is:

1. An autonomous mobile milking implement comprising a frame, a sub-frame, at least one teat cup holder, and a tilting mechanism for tilting the at least one teat cup holder;

wherein the teat cup holder is connected to the sub-frame by the tilting mechanism which comprises an intermediate arm, the intermediate arm being connected to the sub-frame at a first joint and pivotable with respect to the sub-frame about the first joint, and the teat cup holder being connected to the intermediate arm at a second joint and pivotable with respect to the intermediate arm about the second joint;

wherein the intermediate arm and first and second joints are arranged to tilt the teat cup holder between a first position in which a teat cup placed on the teat cup holder is substantially vertical and has an upward oriented aperture, and a second position, which is at an angle H to the first position, wherein the angle H is measured in a vertical direction and is at least 135°; and wherein the sub-frame is connected to the frame by a mechanism arranged to adjust the height of the sub-frame and the intermediate arm being connected to the sub-frame upwards and downwards with respect to the frame.

2. The milking implement according to claim 1, wherein the intermediate arm is arranged to pivot about the first joint with respect to the sub-frame over a first angle in a vertical direction, and the teat cup holder is arranged to pivot about the second joint with respect to the intermediate arm over a second angle in a vertical direction, and wherein the first and second angles equal the angle H.

3. The milking implement according to claim 1, further comprising at least one tilting actuator arranged to tilt the at least one teat cup holder.

4. The milking implement according to claim 1, wherein the mechanism for adjusting the height of the sub-frame comprises a parallelogram construction.

5. The milking implement according to claim 1, wherein the sub-frame comprises a portion which is pivotable with respect to the frame.

6. The milking implement according to claim 5, wherein the pivotable sub-frame portion is connected to the frame by a third joint, the sub-frame being arranged to pivot about the third joint with respect to the frame.

7. The milking implement according to claim 5, further comprising a stop on the frame, wherein the third joint co-operates with the stop and wherein the sub-frame portion is tiltable about the stop when the sub-frame is moved downward.

8. The milking implement according to claim 1, further comprising a cleaning device with a sprayer arranged for spraying a liquid onto the teat cup.

9. The milking implement according to claim 1, wherein the frame comprises a mobile autonomous vehicle.

10. The milking implement according to claim 1, further comprising a replacing tether connecting the teat cup to the milking implement and being operable to return the teat cup to the teat cup holder, wherein operation of the tether causes tilting of the teat cup holder.

11. The milking implement according to claim 1, wherein, in the second position, the teat cup is oriented with its aperture facing at least partly downwards.

* * * * *